UNITED STATES PATENT OFFICE.

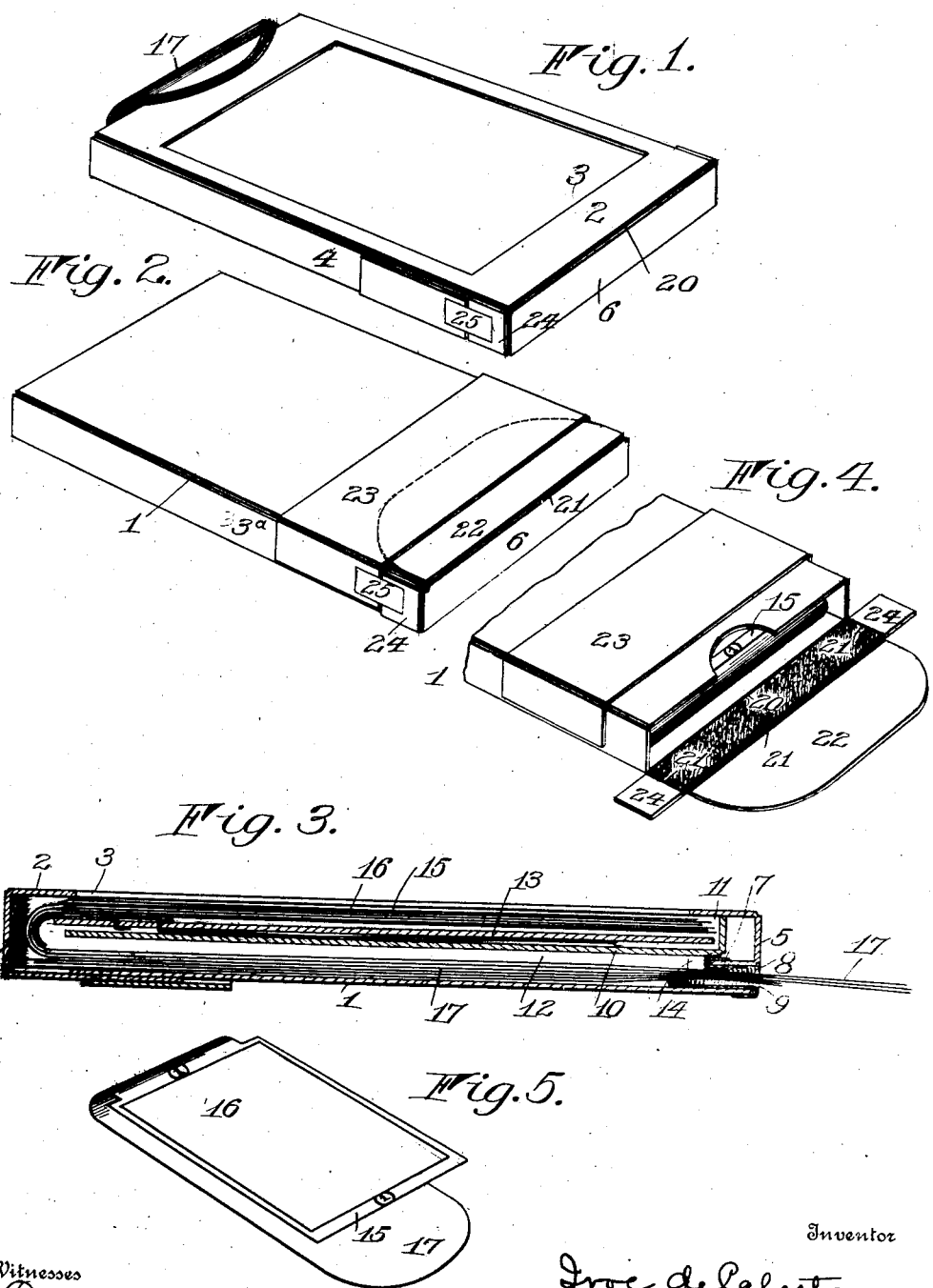

IVOE DE CALESTA, OF ROCHESTER, NEW YORK, ASSIGNOR TO ROCHESTER OPTICAL COMPANY, OF ROCHESTER, NEW YORK, A CORPORATION OF NEW YORK.

PHOTOGRAPHIC-FILM PACKAGE.

No. 839,107. Specification of Letters Patent. Patented Dec. 25, 1906.

Application filed October 26, 1904. Serial No. 230,023.

*To all whom it may concern:*

Be it known that I, IVOE DE CALESTA, of Rochester, in the county of Monroe and State of New York, have invented certain new and useful Improvements in Photographic-Film Packages; and I do hereby declare the following to be a full, clear, and exact description of the same, reference being had to the accompanying drawings, forming a part of this specification, and to the reference-numerals marked thereon.

My present invention relates to photographic-film packages, particularly of that class described in Letters Patent Nos. 728,718 and 728,719, granted May 19, 1903, to the Rochester Optical & Camera Company, in which the films are separately exposed and then moved to a storage-chamber contained in the package, from which they are subsequently removed for development.

The construction of the film-packages contained in the patents referred to and as they have been placed upon the market is such that the exposed films can only be removed for development by the destruction of the package or casing, and therefore the operator is obliged to expose all of the films in the package before he can develop any of them.

The object of my invention therefore is to improve film-packages of this class by providing means whereby the operator may, after having exposed one or more of the films, remove from the package and develop some or all of those exposed without disturbing or fogging the unexposed films in the package, which may be subsequently exposed in the camera or in the adapter shown in said Letters Patent No. 728,719.

In the accompanying drawings, Figure 1 is a perspective view of a film-package embodying my improvements. Fig. 2 is a similar view of the other side thereof. Fig. 3 is a longitudinal sectional view of the same. Fig. 4 is a perspective view showing the end of the package opened. Fig. 5 is a perspective view of one of the films and its operating-sheet detached.

Similar reference-numerals in the several figures indicate similar parts.

The outer casing of the package is preferably composed of a single piece of cardboard, press-board, or similar thin light material bent up into rectangular form and embodying the back 1, the front 2, having the exposure-aperture 3 therein, the sides 3ª and 4, (the latter embodying the two overlapping thicknesses of material,) and the stationary end 5 and the removable end 6. The end 5 is turned inward and coöperates with the frame 7, carrying the light-excluding brush 8, between which and the brush 9 the operating portions of the film backing-sheets extend.

10 indicates the stationary septum dividing the interior into the chamber 11 for the unexposed films and the chamber 12 for the exposed films, and 13 the movable follower in the chamber 11.

14 indicates the stops for the engagement of the ends of the films or the shoulders on the backing-sheets.

15 indicates the film backing-sheets, to which the films 16 are secured at one end, having the manipulating portions 17 for drawing them from one chamber to the other and which are adapted to be severed.

All of the parts described are substantially the same as those contained in the before-mentioned patents, excepting the end 6 constituting the end of the chamber 12, presently described, and the film backing-sheets 15, which latter, in addition to the designating-numbers on the operating ends 17, are preferably provided with a corresponding designating-number on the edge beneath the lower end of the film, as shown in Fig. 5, so that the operator may inspect the same when the end 6 of the package is opened.

The manner of manipulating the films is of course the same as in the prior patents referred to; but to enable the operator to remove for development any of the films from the chamber 12 I provide means for obtaining access to said chamber, which is capable of being closed light-tight again to permit the remaining films to be exposed in the usual manner. In the present embodiment this is accomplished by forming the end 6 of the casing as a continuation of the front 2 and hinged or rendered flexible at 20 and 21 by scoring or otherwise and provided with a tucking-flap 22, adapted to extend over the rear face of the casing and beneath a band or loop 23, secured to the casing. At the ends of the part 6 are the shorter cover-flaps 24, extending up the sides of the casing and secured by paper strips or labels, (indicated by 25,) which may be severed by the operator when he desires to open the end of the package to remove one or more of the exposed films. When the end 6 of the package is turned back, the numbers on the lower ends of the backing-sheets of the exposed films may be inspected, the films desired may be removed, and the package closed again by tucking the flap 22 beneath the strip 23 and the remainder of the films exposed in the usual way.

It will be understood that the package is to be opened only in the dark room, and it is preferable that it be used in connection with the adapter described in Letters Patent No. 728,719, above referred to, as this device serves to hold the movable parts firmly in position.

I claim as my invention—

1. A flat film-package embodying a casing having two parallel film-chambers, one having a front opening, the other normally closed and a passage extending between said chambers and a removable portion on the casing for permitting the removal of films from the normally closed chamber, said package being adapted for the reception of films having backing-sheets with flexible manipulating portions.

2. A flat film-package embodying a normally closed casing having chambers for exposed and unexposed films extending in parallel planes, and a passage between them for the passage of films from one chamber to the other, said casing having a removable portion for permitting access to the end of one of the film-chambers.

3. A flat film-package embodying a normally closed casing having an opening at the front, a film-chamber in rear of said opening, a septum and a chamber for exposed films in rear thereof, and a passage between the chambers, said package being adapted to contain films having flexible manipulating portions adapted to extend through the rear chamber and a removable cover at the end of said rear chamber.

4. A flat film-package embodying a normally closed casing having two film-chambers extending in parallel planes, adapted to receive films contained in one chamber and capable of being passed into the other and provided with flexible manipulating portions and bearing designating-marks thereon in proximity to the film and a removable cover for the end of one of the film-chambers permitting inspection of the designating-marks and the separate removal of the films.

5. A normally closed film-package embodying a casing having a chamber for receiving exposed films, provided with designating-markings at their ends and a removable cover for the chamber for permitting the inspection of the markings and the separate removal of the films.

6. A normally closed film-package embodying a casing having chambers for exposed and unexposed films and a passage between them, the first-mentioned chamber being adapted to hold films having backing-sheets provided with designating-marks thereon at one end and a flexible manipulating portion at the other, said flexible portions being adapted to extend through the passage and a removable cover for the end of the chamber for exposed films located adjacent the said passage.

7. A film-package embodying a casing having a front aperture, two film-chambers in rear thereof, a septum between them and a passage extending between the ends of the chambers and a hinged cover for the casing extending over the passage and having the wings at the ends thereof.

8. A film-package embodying a casing having a front aperture, a film-chamber in rear thereof, an end cover hinged at the edge of one of the faces of the package having end flaps and a tucking-flap and a loop engaged by the latter.

9. A film-package embodying a casing having film-chambers extending in parallel planes and a passage connecting them at one end and a movable cover for the end of one of said chambers having a portion extending over one side of the casing and flaps extending over the edges.

IVOE DE CALESTA.

Witnesses:
G. WILLARD RICH,
F. F. CHURCH.